Dec. 5, 1961  G. L. WILLIAMS  3,011,532
MULTIPLE PURPOSE WOODWORKING APPARATUS
Filed Aug. 29, 1960  2 Sheets-Sheet 1

INVENTOR.
GEORGE L. WILLIAMS
BY *Elliott & Pastoriza*
·ATTORNEYS·

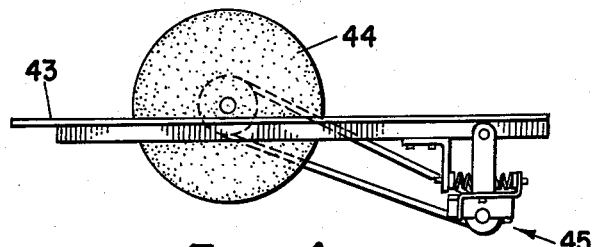
FIG. 4.
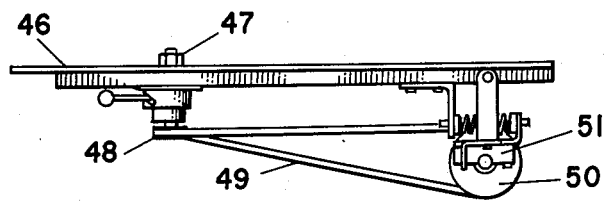
FIG. 5.
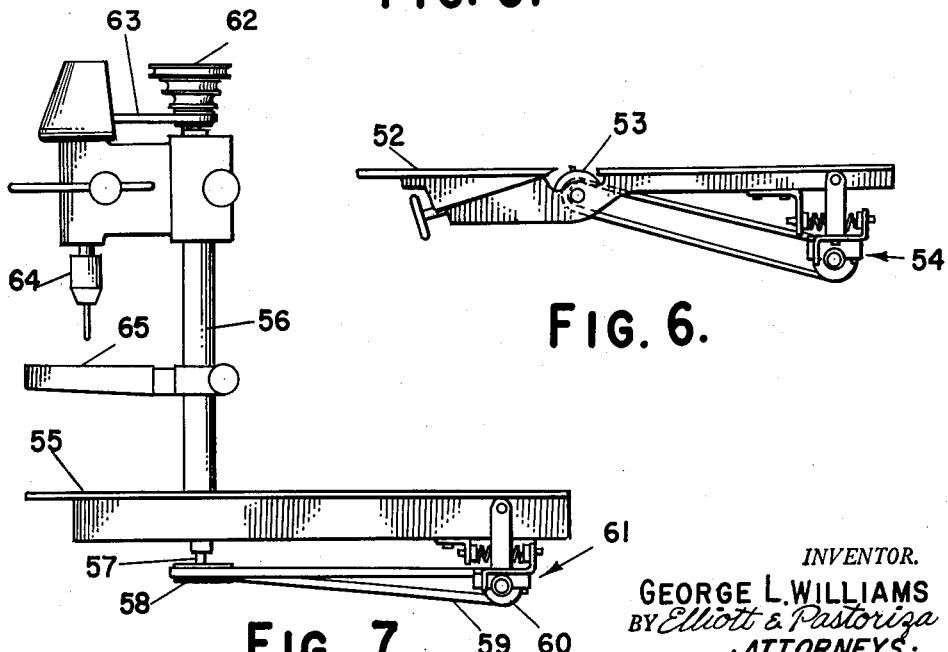
FIG. 6.
FIG. 7.
INVENTOR.
GEORGE L. WILLIAMS
BY Elliott & Pastoriza
ATTORNEYS.

3,011,532
MULTIPLE PURPOSE WOODWORKING APPARATUS
George L. Williams, 250 20th St., Santa Monica, Calif.
Filed Aug. 29, 1960, Ser. No. 52,595
4 Claims. (Cl. 144—1)

This invention relates generally to woodworking tools and more particularly to a multiple purpose power operated woodworking apparatus for carrying out a plurality of different types of woodworking operations.

Multiple purpose woodworking tools are generally old in the art. However, most such structures are built about the lathes as a basic powered unit. Conversion of the lathe into a drill press is achieved by rotating certain structural members through ninety degrees. To provide a saw, various adapting structures must be employed and generally, there does not result a table saw structure in which the table itself has any appreciable area.

Since such prior art structures are built up from a basic lathe structure, lathe operations are most easily carried out thereby. The conversion to other types of woodworking tools results at best in an inferior structure as compared to the actual powered woodworking tool for which the modified structure is to serve as a substitute.

Actually, the most frequently employed power tool in woodworking is the table saw. Logically, therefore, any multiple purpose woodworking structure should be built about the table saw as a basic unit.

With all of the foregoing in mind, it is a primary object of this invention to provide a greatly improved multiple purpose woodworking apparatus in which various different woodworking operations may be carried out to greater advantage than is possible with prior art devices supposedly capable of performing similar functions.

More particularly, it is an object to provide an improved multiple purpose woodworking apparatus built about a table saw structure as a basic unit to the end that the design of the entire structure is directed towards that particular operation which is most frequently carried out by woodworkers.

Another important object of this invention is to provide an improved multiple purpose woodworking apparatus in which conversion from one type of woodworking tool to another may be readily effected in minimum time and with minimum effort.

Other objects of the invention are to provide an improved multiple purpose woodworking tool which is extremely rugged and easy to operate and which may be manufactured relatively economically as compared to present day multiple purpose tools presently available.

Briefly, these and many other objects and advantages of this invention are attained by providing a basic work table having a flat top surface approximating the size of a conventional stable saw surface. This surface is provided with a cutout preferably rectangular in shape for individually receiving different similarly dimensioned inserts. Each of the inserts includes a particular type of woodworking power tool.

The table itself includes a single motor unit mounted on its under side and arranged to be coupled to the particular woodworking tool associated with the insert when the insert is positioned within the cutout opening. By this arrangement, the same table and power unit may be employed to support and operate a plurality of different types of woodworking tools which may be retained in a convenient rack adjacent to the table for ready insertion and removal. The design is such that there is always provided a large flat working area so that those operations most frequently carried out such as sawing, jointing, planing, shaping, and the like are done with apparatus most nearly simulating the corresponding apparatus if purchased as a separate powered unit.

A better understanding of this invention will be had by now referring to a preferred embodiment thereof as illustrated in the accompanying drawings, in which.

Figure 1:
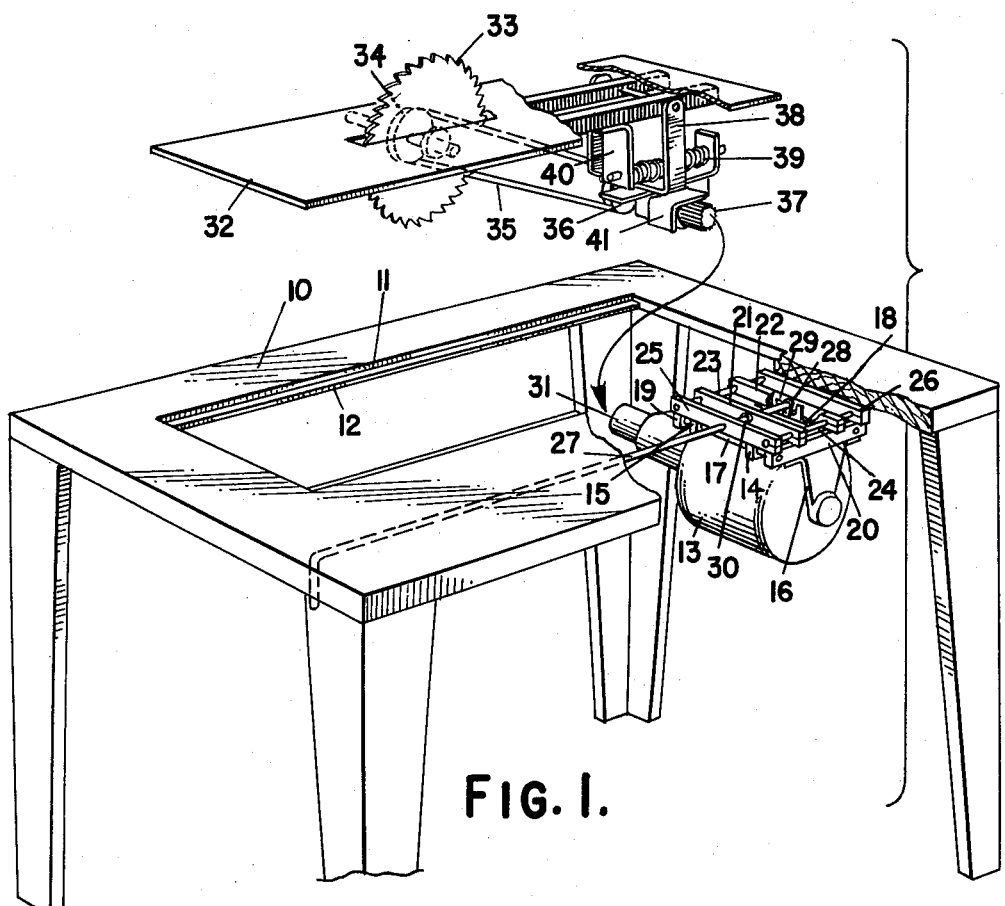
FIGURE 1 is a cut-away perspective view partly exploded showing the basic structural components of the present invention.
Figures 2, 3:
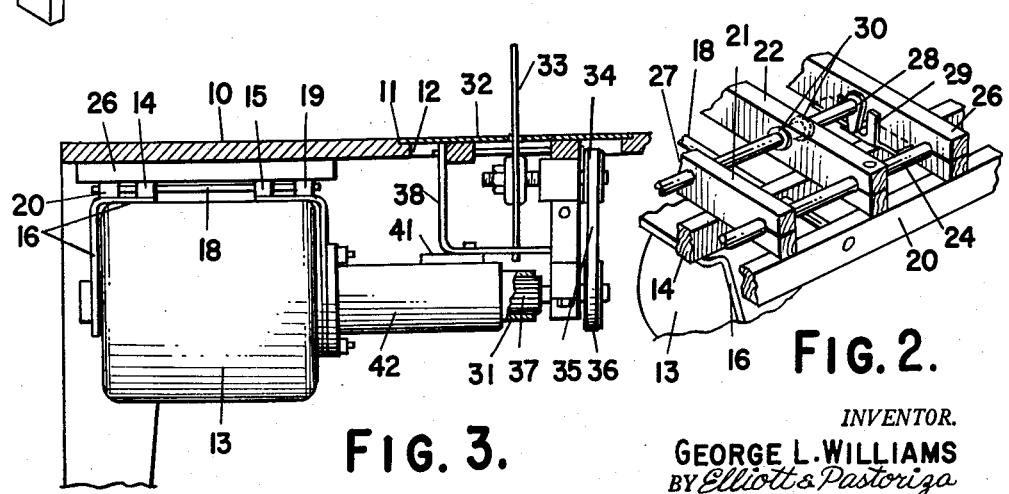
FIGURE 2 is an enlarged fragmentary perspective view of a portion of the structure of FIGURE 1.
FIGURE 3 is a front elevational view partly in cross section of part of the structure of FIGURE 1; and, FIGURES 4, 5, 6, and 7 are side elevational views of different types of insert structures for use with the basic structure illustrated in FIGURE 1.

Referring to both FIGURES 1 and 2, the improved multiple purpose woodworking apparatus comprises a table 10 provided with a substantially rectangularly shaped cutout 11 having a marginal ledge portion 12. Mounted to the under side of the table adjacent the cutout 11 is a motor 13 rigidly secured to a first pair of longitudinally extending support bars 14 and 15 by securing flange 16. The bars 14 and 15 are provided with transverse bore openings for receiving guide rods 17 and 18, respectively, so that the motor and bars 14 and 15 may move laterally or in a direction parallel to the transverse edge of the cutout 11. The ends of the guide rods 17 and 18 are secured to a second pair of longitudinally extending bars 19 and 20.

The bars 19 and 20 in turn are rigidly secured to a first pair of transverse bars 21 and 22. Bars 21 and 22 are provided with suitable bores for receiving guide rods 23 and 24 running at right angles to the guide rods 17 and 18. The ends of the guide rods 23 and 24 are respectively secured to a second pair of transverse bars 25 and 26 rigidly secured to the under side of the table 10.

With the above described arrangement, the transverse bars 21 and 22 and the longitudinal bars 19 and 20 secured thereto constitute essentially a first carriage means capable of movement along the guide rods 23 and 24 in a fore and aft direction or in a direction generally parallel to the longitudinal edge of the cutout 11. The longitudinal bars 14 and 15 together with the flange 16 rigidly secured thereto may be deemed a second carriage means mounted by the guide rods 17 and 18 for lateral movement with respect to the first carriage means in a direction generally parallel to the transverse edge of the cutout 11. Thus, the motor 13 is mounted for movement in both a fore and aft direction and in a lateral direction.

The foregoing movement of the motor may be conveniently effected by means of an elongated actuating rod 27 terminating at its near end in FIGURE 1 in a bent down handle portion and at its other end in a cam 28. Cam 28 cooperates with a U-shaped cam receiving structure 29 rigidly secured to the longitudinal bars 14 and 15. As shown, the actuating rod 27 passes through suitable bores in the transverse bars 25 and 21 and is provided with annular key means 30 on either side of the transverse bar 21 so that fore and aft movement of the rod 27 will move the entire first carriage structure in a fore and aft direction along the guide rods 23 and 24, and rotational movement of the rod 27 will, through the cam structure, slide the second carriage structure in a lateral direction on the guide rods 17 and 18. By this arrangement, a suitable sleeve clutch 31 on the motor may be positioned relative to the cutout 11.

As shown in the exploded view of FIGURE 1, there is provided an insert structure above the table structure 10 and cutout 11 including a rectangularly shaped insert 32 receivable within the cutout 11, the edge portions of the insert resting on the ledge 12 so that the top surface of the insert is flush with the top surface of the table.

This insert 32 serves to mount a woodworking tool such as a circular saw 33. Saw 33 in turn is coupled to pulley 34 and drive belt 35 to a second pulley 36 connected to a splined clutch shaft 37 receivable within the sleeve 31 of the motor 13 when the insert 32 is positioned within the cutout 11. The splined shaft 37 is resiliently supported to the insert 32 through a pivoted support 38 and resilient spring 39 bearing against a rigid flange 40 secured to the insert. The spring 39 will tend to bias the pulley 36 away from the pulley 34 to maintain tension in the belt 35. Also included is a stop plate 41 adjacent to the splined clutch shaft 37.

With reference to FIGURE 3, it will be noted that the clutch sleeve 31 of the motor 13 is surrounded in part by a stationary cylindrical member 42. This member 42 is arranged to engage the stop 41 when the clutch sleeve 31 is axially aligned with the splined clutch shaft 37 on the insert structure.

The operations involved in positioning the insert 32 within the cutout 11 in order that the motor 13 may drive the particular woodworking tool in question will be evident from the above description. Initially, the motor 13 is moved to its extreme lateral position to the left as viewed in FIGURE 3 or to the right as view in FIGURE 1 by rotating the rod 27 of FIGURE 1 in a counterclockwise direction. Also, the motor is preferably longitudinally moved in a fore and aft direction to the position closest to the far end of the table shown in FIGURE 1. The cutout 11 is then free of obstructions for receiving the insert 32. With the insert 32 in position, the rod 27 may be manually pulled by an operator to move the first carriage structure towards the operator until the cylindrical member 42 circling the motor shaft engages the stop plate 41 of the insert. In this position, as mentioned, the clutch sleeve 31 is axially aligned with the clutch shaft 37 so that rotation of the rod 27 in a clockwise direction will then cam the second carriage structure transversely to telescope the sleeve 31 over the splined clutch shaft 37 thereby engaging the two clutches and enabling power transfer from the motor 13 to the splined clutch shaft 37. Rotation of the clutch shaft 37 will in turn rotate the pulley 36 and thus the circular saw 33 through the medium of the drive belt 35 and pulley 34.

Removal of the insert 32 is accomplished by reversing the various steps set forth above. Thus, the motor is initially moved transversely to the right by rotation of the actuating rod 27 in a counterclockwise direction. The motor may then be moved in a rearward direction by simply pushing on the rod 27. The insert 32 is then lifted from the cutout and placed to one side, preferably in a rack or other support structure (not shown) designed for the purpose of holding the insert when not in use.

It will be evident from the above described arrangement that several different types of woodworking tools may be mounted on similarly dimensioned inserts and substituted for the insert 32 to enable a plurality of different woodworking operations to be carried out. Several such additional types of inserts are illustrated in FIGURES 4, 5, 6, and 7.

Thus, referring to FIGURE 4, there is shown an insert 43 similarly dimensioned to the insert 32 of FIGURE 1 but including a sanding disk 44. Disk 44 is rotated by a belt and pulley arrangement coupled to a clutch shaft structure 45 identical to the structure described with respect to the insert 32 of FIGURE 1.

FIGURE 5 shows another insert 46 supporting a shaper tool 47 which may be powered by a pulley 48 and ninety degree twisted drive belt 49 coupled from a pulley 50 connected to a splined clutch shaft structure 51 similar to the splined clutch shaft structures 37, 38, and 39 described in connection with the insert 32.

FIGURE 6 illustrates another insert 52 incorporating a jointer tool 53 also coupled by a suitable belt mechanism to a clutch structure 54 similar to the clutch structures heretofore described.

FIGURE 7 shows another insert 55 incorporating a drill spindle mechanism including a vertical hollow column 56. Column 56 incorporates a drive shaft 57 connected by pulley 58 and ninety degree twisted belt 59 to pulley 60 on suitable clutch mechanism 61 similar to the other clutch mechanisms described. The shaft 57 within the hollow column 56 terminates in multiple diameter pulleys 62 any one of which may be connected through a belt such as the belt 63 to the conventional drill spindle structure 64 and cooperating table 65. This structure thus provides essentially a complete drill press which may be operated by the same motor employed for powering the various other tools.

From the foregoing description, it will be evident that several different types of woodworking operations may be carried out, all of the different tools being powered by the same motor unit and all coupled thereto through essentially the same type of clutch mechanism. Thus, in employing any one of the different types of tools as illustrated by way of example in FIGURES 4–7, the identical steps are carried out in inserting corresponding inserts and effecting coupling of the motor thereto by means of the rod 27 of FIGURE 1.

Since only a single table 11 and motor 13 serve to support and drive all of the different types of tools, considerable space is conserved. Moreover, since identical clutch mechanisms are employed on each of the inserts, economy in manufacturing these inserts is also realized. The only difference in the various inserts is in the form of the actual tools employed therewith.

While only one particular embodiment of the invention has been set forth and described, many variations and modifications that fall clearly within the scope and spirit of the invention will occur to those skilled in the art. The multiple purpose woodworking power apparatus of this invention is therefore not to be thought of as limited to the particular embodiment set forth merely for illustrative purposes.

What is claimed is:

1. A multiple purpose woodworking apparatus comprising, in combination: a work table having a substantially rectangular cutout in its top surface; first carriage means mounted to the under side of said table for movement in a fore and aft direction generally parallel to a longitudinal edge of said cutout; second carriage means mounted to said first carriage means for movement in a lateral direction generally parallel to a transverse edge of said cutout; a motor secured to said second carriage means and including a clutch sleeve on its shaft whereby said motor may be moved in both fore and aft and lateral directions to position said clutch sleeve with respect to said cutout; an insert structure including a flat rectangular insert dimension to be received in said cutout; a woodworking tool mounted on said insert; a splined clutch shaft resiliently mounted to the under side of said insert in a position to be received in said clutch sleeve of said motor; and motion transmission means coupling said clutch shaft to said woodworking tool for operation by said motor.

2. An apparatus according to claim 1, including a stop member mounted to the under side of said insert adjacent said splined clutch shaft, and positioned to check fore and aft movement of said motor to a position in which subsequent transverse movement will telescope said clutch sleeve over said clutch shaft.

3. An apparatus according to claim 2, including a plurality of additional insert structures each including rectangular inserts similarly dimensioned to be individually received in said cutout and each including a splined clutch shaft supported and positioned in a manner similar to said first mentioned splined clutch shaft, said additional inserts mounting different woodworking tools, said tools being respectively coupled to their corresponding splined clutch shafts whereby any one particular insert may be positioned in said cutout for operation by said motor depending upon the particular woodworking operation to be carried out.

4. A multiple purpose woodworking apparatus comprising, in combination: a table having a cutout portion; an insert receivable within said cutout portion; a woodworking tool secured to said insert; a first clutch member mounted to the under side of said insert at a given level below said table; motion transmission means connecting said first clutch member to said tool; a motor having a shaft disposed at said given level beneath said table; a mating clutch member on said shaft; a first carriage means coupled to the under side of said table for movement in a first given direction; and a second carriage means mounting said motor to said first carriage means for movement in a direction at right angles to said first given direction, whereby said motor may be moved in a direction to bring said mating clutch member into alignment with said first clutch member and thence moved in a direction to cause said mating clutch member to engage said first clutch member so that said woodworking tool may be driven by said motor.

References Cited in the file of this patent
UNITED STATES PATENTS

| | | |
|---|---|---|
| 1,506,154 | Berthelsen et al. | Aug. 26, 1924 |
| 1,803,402 | Napier | May 5, 1931 |
| 1,867,269 | Kimble | July 12, 1932 |
| 2,016,528 | Wilson | Oct. 8, 1935 |
| 2,567,127 | Shaffner | Sept. 4, 1951 |
| 2,599,170 | Franks | June 3, 1952 |
| 2,615,479 | Bearup | Oct. 28, 1952 |
| 2,776,682 | Mullen | Jan. 8, 1957 |
| 2,790,469 | Verplank | Apr. 30, 1957 |
| 2,810,412 | Roug | Oct. 22, 1957 |
| 2,892,475 | Lapsley | June 30, 1959 |